US009424381B2

(12) United States Patent
Dhanwada et al.

(10) Patent No.: US 9,424,381 B2
(45) Date of Patent: Aug. 23, 2016

(54) CONTRIBUTOR-BASED POWER MODELING OF MICROPROCESSOR COMPONENTS

(71) Applicant: GLOBALFOUNDRIES INC., Grand Cayman (KY)

(72) Inventors: Nagashyamala R. Dhanwada, Fishkill, NY (US); David J. Hathaway, Underhill, VT (US); Victor Zyuban, Yorktown Heights, NY (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 545 days.

(21) Appl. No.: 13/932,662

(22) Filed: Jul. 1, 2013

(65) Prior Publication Data

US 2015/0006142 A1    Jan. 1, 2015

(51) Int. Cl.
*G06F 17/50* (2006.01)

(52) U.S. Cl.
CPC ....... *G06F 17/5036* (2013.01); *G06F 2217/78* (2013.01)

(58) Field of Classification Search
USPC ................................ 703/2, 18; 716/103, 108
See application file for complete search history.

(56) References Cited

U.S. PATENT DOCUMENTS

| | | | | |
|---|---|---|---|---|
| 5,521,834 A | * | 5/1996 | Crafts | G06F 17/5022 716/108 |
| 5,668,732 A | * | 9/1997 | Khouja | G06F 17/5022 702/181 |
| 5,682,320 A | * | 10/1997 | Khouja | G06F 17/5022 716/103 |
| 5,696,694 A | * | 12/1997 | Khouja | G06F 17/5022 716/113 |
| 5,838,947 A | * | 11/1998 | Sarin | G06F 17/5022 703/14 |
| 6,075,932 A | * | 6/2000 | Khouja | G06F 17/5022 702/60 |
| 6,157,903 A | * | 12/2000 | Hu | G06F 17/5022 703/14 |
| 7,016,794 B2 | | 3/2006 | Schultz | |
| 7,900,166 B2 | | 3/2011 | Kariat et al. | |
| 7,962,320 B2 | | 6/2011 | Ogawa et al. | |
| 7,973,594 B2 | | 7/2011 | Amrutur et al. | |
| 2010/0146350 A1 | * | 6/2010 | Lin | G01R 31/31721 714/738 |
| 2011/0077882 A1 | | 3/2011 | Agrawal et al. | |

OTHER PUBLICATIONS

Dhanwada et al., "Leakage Power Contributor Modeling," Mar./Apr. 2012, IEEE Design and Test of Computers, pp. 71-78.
Chaudhury et al., "Synthesis of Finite State Machines for Low Static and Dynamic Power," 2007 IEEE International Symposium on Integrated Circuits (ISIC-2007), pp. 437-440.
Zhao et al., "Predictive Technology Model for Nano-CMOS Design Exploration," ACM Journal on Emerging Technologies in Computing Systems (JETC) JETC Homepage archive vol. 3 Issue 1, Apr. 2007 Article No. 1 pages.
Mukhopadhyay et al., "Modeling and Estimation of Failure Probability due to Parameter Variations in Nano-scale SRAMs for Yield Enhancement," VLSI Circuits, 2004. Digest of Technical Papers. 2004 Symposium on. IEEE, 2004, pp. 64-67.

(Continued)

*Primary Examiner* — Thai Phan
(74) *Attorney, Agent, or Firm* — Thompson Hine LLP

(57) ABSTRACT

A method for generating a power model for a device includes identifying a device-level set of power contributors for a given state of the device, wherein each power contributor in the device-level set of power contributors contributes to power dissipation when the device is in the given state, and generating the power model for the device based on the device-level set of power contributors, wherein the power model is independent of process, voltage, and temperature.

16 Claims, 2 Drawing Sheets

(56) References Cited

OTHER PUBLICATIONS

Chen et al., "Timing Macro-modeling of IP Blocks with Crosstalk," IEEE/ACM International Conference on Computer-Aided Design, ICCAD'04, pp. 155-159, 2004 consists of 5 unnumbered pages.

Dhanwada et al., "Algorithm and System for Generating the Contributor Based Power Abstract for Microprocessor Components" consists of 13 unnumbered pages.

"Modeling Methodology and Tools for Contributor based Power Abstract Generation for Large IP Blocks" consists of 6 unnumbered pages.

* cited by examiner

CONTRIBUTOR-BASED POWER MODELING OF MICROPROCESSOR COMPONENTS

BACKGROUND OF THE INVENTION

The present invention relates generally to power modeling for microprocessors and relates more specifically to contributor-based power modeling.

Power consumption is a key factor in the design of electronic products, since it directly affects thermal margins, cost, and reliability. At the same time, increasing process variation in the nanometer era complicates both power analysis and optimization. Power-aware design flows have been developed to address the challenges arising from increased design complexity and the need to control power consumption.

The increase in design complexity, and the need for accurate models, has necessitated complex power-aware design flows. The challenges in delivering accurate models are due at least in part to variations at the device level and variations at the block/function level. Variation occurs at the device level as a result of increases in process corners and of an exponential dependence of leakage on temperature and voltage. Variation at the block/function level occurs as a result of power saving features (e.g., clock gating, power gating) and widely varying workload characteristics).

For instance, a typical cell library includes hundreds of cells, each having multiple states and transistors. Cell library characterization usually generates power data for several process corners. However, when power analysis is being performed at the block level, library characterization may not be available at a requested process corner. In this case, one must interpolate between process corners for which library characterization data is available. This interpolation increases the run time of and may decrease the accuracy of the power analysis.

The above challenges are magnified when attempting to analyze a chip that comprises multiple blocks, particularly when the analysis must be performed under several different corner conditions and with several different workloads. Conventional power-aware design flows based on PVT (process, voltage, and temperature)-specific power models are not able to efficiently perform the necessary hierarchical analysis at the chip level.

SUMMARY OF THE INVENTION

A method for generating a power model for a device includes identifying a device-level set of power contributors for a state of the device, wherein each power contributor in the device-level set of power contributors contributes to power dissipation in the device, and generating the power model for the device based on the device-level set of power contributors, wherein the power model is independent of process, voltage, and temperature.

A system for generating a power model for a device includes a processor and a computer readable storage medium that stores instructions which, when executed, cause the processor to perform operations including identifying a device-level set of power contributors for a given state of the device, wherein each power contributor in the device-level set of power contributors contributes to power dissipation when the device is in the given state, and generating the power model for the device based on the device-level set of power contributors, wherein the power model is independent of process, voltage, and temperature

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
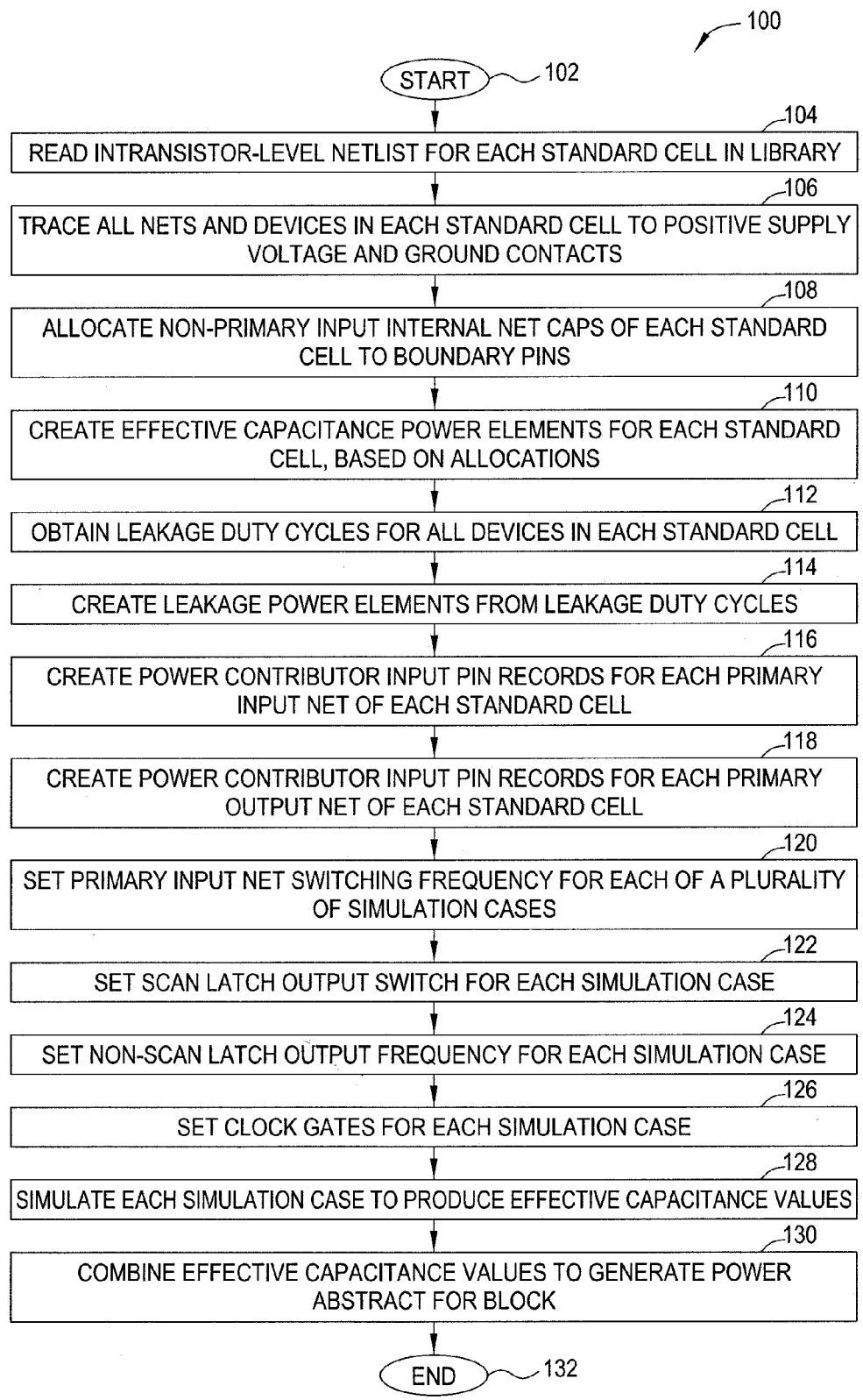
FIG. 1 is a flow diagram illustrating one embodiment of a method for generating contributor-based abstracts, according to the present invention.

In one embodiment, the invention is a method and apparatus for contributor-based power modeling of microprocessor components. Embodiments of the invention employ a contributor-based power modeling technique that exploits the inherent separability of the components that consume power and provides a generalized modeling methodology for defining contributor-based power abstracts. In particular, the present invention achieves power modeling through use of contributor-based power models, an abstraction definition, and a technique for generating contributor-based power abstracts for complex blocks of an electronic device. Contributor-based modeling of the disclosed type facilitates generation of PVT-independent power models for the high-level blocks of an electronic device.

Within the context of the present invention, a "power contributor" or "contributor" is understood to refer to a condition that contributes to power dissipation in a device; the total power dissipated is the sum of these contributors. For instance, simple power contributors include the channel or gate leakage of a single field effect transistor (FET), the leakage of a FET stack, or the charging of a single node capacitance. Each contributor generally behaves the same regardless of the cell, and the same power contributors will generally apply in many library cell states. Different contributor types encapsulate different physics, and different contributor instances will reflect different parameter dependencies.

A "power contributor model" or "power model" contains all instance-independent information needed to model the power consumed by an instance of a particular cell, along with additional information that may be used to differentiate and identify different portions of the power consumption (e.g., contact-to-device diffusion area, gate contact for power grid analysis, latch versus data power, etc.). However, evaluation of the model requires application of instance-specific information (e.g., switching activities, voltages applied to power pins, switching frequency of clock pins, temperature, field effect transistor threshold variations, process sigma, etc.).

A fundamental component of a power contributor model according to the present invention is a "power element." A power element does not store power or energy numbers, but instead stores the physical parameters (e.g., switching capacitance, resistances, current sources, effective leaking device width) that can be used to compute power at any PVT condition. Thus, the power model is independent of switching activity, frequency, process, temperature, and voltage. Moreover, a power element does not model the total power of a cell under a given condition. Instead, each power element of a model for a given cell type is evaluated for the process, voltage, temperature, and operating conditions (state and activity) of each design instance of that cell type, and the contributions of all power elements are summed to determine the total power of the design instance. In addition to power elements, the contributor model for a cell type may contain information such as the power supply pins of the cell that provide power to each of the output nets, or the load capacitances of each of the inputs. In one embodiment, the power contributor model of the present invention considers two primary power elements: alternating current (AC) elements and transistor leakage elements.

AC elements represent power dissipated while charging and discharging capacitances during switching events. AC elements include a reference pin parameter that specifies the pin from which a frequency is obtained. This frequency is used to convert the energy per event for a power element to a power value. In some cases, the reference pin is a clock pin; however, for macros that lack clocks, another type of pin could be specified. Each AC power element includes energy, an effective capacitance value from which energy can be computed, or other parameters from which an energy or an effective capacitance can be determined. Since the power contributor model of the present invention is an abstraction of the cell whose power is being modeled, the effective capacitance will typically encapsulate the effects of many physical capacitances and power dissipation due to short circuit currents. These physical capacitances typically will not switch at the same rate as the reference pin, and hence the effective capacitance may or may not be equal to the sum of the physical capacitances whose power impact is modeled by the effective capacitance.

AC elements may include an activity list, which is used to parameterize the AC power in terms of one or more switching signals. The activity list is similar to the weight list common to all power elements. Each element of the activity list will specify a pin, net, pin group, or net group whose "activity" is to be used to parameterize the AC power element. The activity list is thus a list of activity factors whose values will be multiplied together to compute a weighting factor for the AC element. The numeric value of a parameter in an activity factor is the switching frequency of the specified pin, net, pin group, or net group, divided by the cycle frequency of the reference pin. Activity factors may be boundary weight factors (i.e., a value on a pin of the block) or internal weight factors (i.e., modeling a value for some internal net or set of nets of the block).

Each activity factor X in the activity list may be included in the product as X, (1−x), or $X^2$ (i.e., the true, complement, or squared values, respectively). These modifiers are not strictly needed, since a squared term can be represented by including the same weight parameter twice, and a complement term can be represented by two elements: one element without the weight parameter and one element with the weight parameter and a negated scaling value. A product term of multiple activities is also possible in the abstraction, such as $X*Y^2$, $(1-X)*Y*Z$. Any polynomial on N different activity factors is possible in the present model.

The other primary power elements—transistor leakage elements—represent static leakage of a transistor. The various modes of leakage include channel leakage (i.e., modeling drain to source leakage), gate_off leakage (i.e., modeling gate leakage when the gate is off), and gate_on leakage (i.e., modeling gate leakage when the gate is on). A transistor leakage power element includes a leakage type, a device type, a channel length, a device width (the primary value that can be summed), and a finger count (a secondary value that can be summed). In one embodiment, a technology leakage application programming interface (API) encapsulates leakage equations used to compute the leakage for an instance at a particular temperature, process sigma, and voltage.

Realistically, some devices may spend some time in leakage states with only a fraction of the full supply voltage across them or in a state with a back bias between gate and source. However, in one embodiment, the leakage states represented in the leakage elements assume full rail voltages on all pins and zero gate bias. Therefore, leakage weights are computed and used to generate a power abstract such that the evaluation of the power abstract results in the same leakage current for each device as it would be when computed by averaging the instantaneous leakage current over the simulation cycles. The product of the device width and the leakage weight factor is referred to herein as the "effective leaking width." Similarly, the product of the device count and the leakage weight is referred to herein as the "effective leaking device count." Table 1 illustrates the values that are applied to the device terminals for various leakage types.

TABLE 1

Values for Various Leakage Types

| Device | Leakage Type | Gate | Source | Drain |
|---|---|---|---|---|
| PFET | channel | Vdd | Vdd | Gnd |
| PFET | gate_on | Gnd | Vdd | Vdd |
| PFET | gate_off | Vdd | Vdd | Gnd |
| NFET | channel | Gnd | Gnd | Vdd |
| NFET | gate_on | Vdd | Gnd | Gnd |
| NFET | gate_off | Gnd | Gnd | Vdd |

As discussed above, power contributor modeling facilitates generation of PVT-independent power models for high level blocks of a device. In one embodiment, the power contributors for a particular state of interest of a high level block of a device are identified by determining the states of the block's constituent cells and the cells' power contributors in those states. For incompletely specified states of the block, state probabilities may be determined for various possible states of the constituent cells (e.g., using probabilistic propagation or random simulation). The contributors for each of the cell states are then determined, weighted by cell state probabilities (if needed) with power rail specifications mapped to the power rail specifications of the block. Finally, all compatible contributor instances are summed to form an aggregate list of power contributors for the block.

Further embodiments of the invention disclose abstractions for leakage and dynamic power modeling. In the case of leakage power, the simplest form of power contributor summation merely accumulates a count of the instances of each power contributor. To satisfy contributor compatibility, all parameters (e.g., device type, length, width, and power rail references) are identical in the contributor instances being summed. Alternatively, some parameter (e.g., device width) can be treated as a "size" parameter for the contributor, and this parameter can be summed for each set of compatible contributors instead of simply summing contributor counts. Summing the size parameter works well when the power is proportional to the chosen size parameter, but narrow channel effect causes a deviation from this leakage. Typical leakage curves as a function of device width are roughly linear with width and, for physical reasons, must be near-linear for large width but have a non-zero intercept. For a linear leakage function, one can determine the total leakage of the set of contributors by summing both the count (N) and the device width (W). This does not require that the intercept ($I_0$) and the slope ($I_W$) of the linear current function be known, but only that f(W) be linear in width, for example as expressed below:

$$I_{total} = \sum_i f(W_i) \quad \text{(EQN. 1)}$$
$$= \sum_i (I_0 + I_W W_i)$$
$$= N(I_0 + I_W(W_{total}/N))$$
$$= N \, f(W_{total}/N)$$

If leakage is insufficiently linear with width, but can be approximated as piecewise linear, one can determine breakpoints between linear segments (common across all PVT values) and restrict compatibility of contributors for summation to those within the same width range.

The abstraction for dynamic power characterizes power as a function of a clock gating weight factor and input switch rate and latch output switching activity factors. Table 2, below, lists the abstraction for dynamic power in terms of the major AC power contributors (each with its own effective capacitance ($C_{eff}$) value) with the applicable weight and activity factor(s). Names are given to the major power contributors solely for descriptive purposes.

TABLE 2

Dynamic Power Abstraction Contributors

| Name | Weight Factor | Activity Factor(s) |
|---|---|---|
| AlwaysCeff | | |
| GatableCeff | complement (clock gating) | |
| PiSfDepCeff | | true (input switch rate) |
| LoSfDepCeff | | true (latch output switch rate) |
| PiLoXPCeff | | true (input switch rate) true (latch output switch rate) |

The AlwaysCeff component models the base power when clock gating is true and both activity factors are zero. The GatableCeff component models the additional power when clock gating is turned off, but does not include any impact of the switching of the latches clocked by the ungated clock. The PiSfDepCeff and LoSfDepCeff components model the separate power adders due to primary input and latch output switching, respectively. The PiLoXPCeff component models the synergistic delta in power (generally small and often negative) due to the combined switching or primary inputs and latch outputs. In one embodiment, a set of random simulations are performed in order to compute these different effective capacitance values. Each of the random simulations computes all or part of the macro $C_{eff}$ under particular settings of the three macro power parameters. These computations are then combined to produce the $C_{eff}$ values for the AC power contributors listed in Table 2.

Table 3, below, lists the conditions under which the random simulations are performed.

TABLE 3

Simulation Cases for $C_{eff}$

| | Weight factor and activity factor settings | | |
|---|---|---|---|
| Case | Clock gating | Input switch rate | Latch output switch rate |
| 1 | 0 | 0.0 | 0.0 |
| 2 | 1 | 0.0 | 0.0 |
| 3 | 1 | Kpi | 0.0 |
| 4 | 1 | 0.0 | Klo |
| 5 | 1 | Kpi | Klo |

Each random simulation is referred to herein as a "case." Some cases with no input or latch output switching are split to apply zero and one values to the held (non-switching) points, to reduce possible bias due to data switching gating by these values. Some of the cases are non-physical, in the sense that clock gating is performed, but latches are still forced to switch. Such cases are acceptable from an abstraction standpoint, since the power contributor model treats them as separable contributors and latch output activity is forced to be independent of the latch clock and input conditions.

A total $C_{eff}$ is generated using random simulation for each of the cases listed in Table 3. The simulations are then combined to generate the power contributor AC power element $C_{eff}$ values, such that the appropriately scaled sum of the power contributor $C_{eff}$ values results in each of case $C_{eff}$ values for the cases listed in Table 3. In one embodiment, the $C_{eff}$ values for each of the cases are expressed as:

$C_{eff\_1}$=AlwaysCeff+(1−0)*GatableCeff+0.0*PiSfDefCeff+0.0*LoSfDepCeff+0.0*0.0*PiLoXPCeff $C_{eff\_2}$=AlwaysCeff+(0−0)*GatableCeff+0.0*PiSfDefCeff+0.0*LoSfDepCeff+0.0*0.0*PiLoXPCeff $C_{eff\_3}$=AlwaysCeff+(0−0)*GatableCeff+Kpi*PiSfDefCeff+0.0*LoSfDepCeff+Kpi*0.0*PiLoXPCeff $C_{eff\_4}$=AlwaysCeff+(0−0)*GatableCeff+0.0*PiSfDefCeff+Klo*LoSfDepCeff+0.0*Klo*PiLoXPCeff $C_{eff\_5}$AlwaysCeff+(0−0)*GatableCeff+Kpi*PiSfDefCeff+Klo*LoSfDepCeff+Kpi*Klo*PiLoXPCeff       (EQN. 2)

Solving the above set of equations stated in EQN. 2 for the model $C_{eff}$ values yields the following:

AlwaysCeff=$C_{eff\_2}$

GatableCeff=$C_{eff\_1}$−$C_{eff\_2}$

PiSfDepCeff=($C_{eff\_3}$−$C_{eff\_2}$)/Kpi

LoSfDepCeff=($C_{eff\_4}$−$C_{eff\_2}$)/Klo

PiLoXPCeff=($C_{eff\_5}$−$C_{eff\_3}$−$C_{eff\_4}$+$C_{eff\_2}$)/(Kpi*Klo)       (EQN. 3)

To compute the case Ceff values that are needed to solve the set of equations stated in EQN. 3, embodiments of the present invention determine, for each physical capacitance in the macro (e.g., for each net), the average switch rate for the case (i.e., the average number of transitions per clock cycle) multiplied by the physical capacitance value. This product is then summed over all capacitances in the macro. This switch rate is the number of transitions of the net over one half the number of simulation cycles.

FIG. 1 is a flow diagram illustrating one embodiment of a method 100 for generating contributor-based abstracts, according to the present invention. At a high level, the method 100 includes three major steps: (1) generation of power contributor abstracts for standard cell libraries (e.g., by a transistor-level tool or processor); (2) reading in a gate-level description of a block, along with the necessary logic and timing rules (e.g., by a block power abstraction generation tool or processor); and (3) evaluating the power of a block contributor-based abstract to generate a power report (e.g., by a report generating tool or processor).

The method 100 begins in step 102. In step 104, a transistor-level tool or processor reads in a transistor-level net-list for each standard cell in library. In step 106, the transistor-level tool or processor traces, for each standard cell, all nets and devices to the positive supply voltage (Vdd) and ground (Gnd) contacts. In one embodiment, all effective capacitance (Ceff) and leakage data will be associated with the contacts as well.

In step 108, the transistor-level tool or processor allocates, for each standard cell, all non-primary input internal net caps to boundary pins. In one embodiment, if a non-primary input internal net cap is traceable to a clock input, the non-primary input internal net cap is assigned to the clock input. If not traceable to a clock input, the non-primary input internal net cap is apportioned over the outputs. In one embodiment, cap switching is assumed to track allocated pins.

In step 110, the transistor-level tool or processor creates, for each of the standard cells, the Ceff power elements, based on the allocations of the non-primary input internal net caps.

In step 112, the transistor-level tool or processor obtains leakage duty cycles for all devices in each of the standard cells. In one embodiment, the leakage duty cycles are obtained from a random simulation. In step 114, the transistor-level tool or processor creates leakage power contributor model elements from the leakage duty cycle data.

In step 116, the transistor-level tool or processor creates power contributor input pin records for each primary input net in each of the standard cells. In step 118, the transistor-level tool or processor creates power contributor pin supply records for each primary output net in each of the standard cells.

Thus, steps 102-118 constitute a first phase of the method 100 that results in the generation of power contributor models (i.e., Ceff elements and leakage elements) for the standard cells of a transistor-level netlist. In a second phase of the method 100, a block power abstraction generation tool or processor obtains the power contributor models for the standard cells and generates a block power abstract by simulating the cases illustrated in Table 3 (above) in accordance with the leakage and dynamic power abstractions discussed above.

In step 120, the block power abstraction generation tool or processor sets, for each of the cases, the primary input net switching frequency to the product of the clock frequency and the input switch rate. In step 122, the block power abstraction generation tool or processor sets, for each of the cases, the scan latch output switch to zero.

In step 124, the block power abstraction generation tool or processor sets, for each of the cases, the non-scan latch output net frequency to the product of the clock frequency and the latch output switch rate. In step 126, the block power abstraction generation tool or processor sets the clock gates for each case. In one embodiment, the block power abstraction generation tool sets all clock gates to free running for Case 1, but sets all clock gates to gated for Cases 2-5.

In step 128, the block power abstraction generation tool or processor simulates all of the cases in accordance with the above-described settings in order to obtain the output switching and compute the Ceff values. In one embodiment, a logic function aware switch simulation method is used in step 128 to compute the output activities.

In step 130, the block power abstraction generation tool or processor combines the Ceff values for all of the cases, as described above, in order to produce a contributor-based, parameterized power abstract for a block of the device. The method 100 then ends in step 132.

The power abstract can be output in a report and/or used in a chip-level power rollup flow, where the power abstract is specialized under activity and PVT conditions for the chip. The power abstract may also be evaluated under specific conditions to generate a report. A power abstract generated in accordance with the method 100 is precise at least for any single-gate AND, OR, or XOR logic macros or mix of latches and single-gate logic. The resultant power abstract is also accurate for more complex logic blocks, but may be modified to address certain sources of accuracy loss in specific situations (e.g., methods for extracting effective capacitances, presence of latches not switching during execution of workload-driven switching patterns.

Although the method 100 is described above as being performed by specific and/or discrete tools or processors, it will be appreciated that a single processor could be used to implement the entirety of the method 100. Alternatively, tools or processors in addition to those described may be employed.

Figure 2:
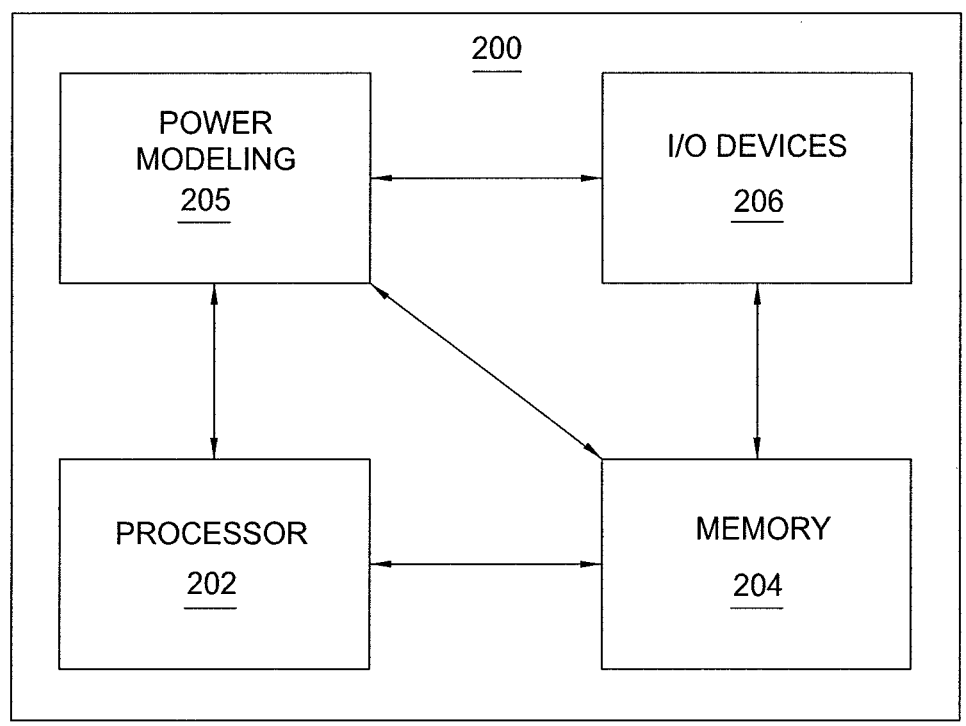
FIG. 2 is a high-level block diagram of the power modeling method that is implemented using a general purpose computing device.

FIG. 2 is a high-level block diagram of the power modeling method that is implemented using a general purpose computing device 200. In one embodiment, a general purpose computing device 200 comprises a processor 202, a memory 204, a power modeling module 205 and various input/output (I/O) devices 206 such as a display, a keyboard, a mouse, a sensor, a stylus, a microphone or transducer, a wireless network access card, an Ethernet interface, and the like. In one embodiment, at least one I/O device is a storage device (e.g., a disk drive, an optical disk drive, a floppy disk drive). It should be understood that the power modeling module 205 can be implemented as a physical device or subsystem that is coupled to a processor through a communication channel.

Alternatively, the power modeling module 205 can be represented by one or more software applications (or even a combination of software and hardware, e.g., using Application Specific Integrated Circuits (ASIC)), where the software is loaded from a storage medium (e.g., I/O devices 206) and operated by the processor 202 in the memory 204 of the general purpose computing device 200. Thus, in one embodiment, the power modeling module 205 for generating a power abstract for a microprocessor component, as described herein with reference to the preceding figures, can be stored on a tangible computer readable storage medium or device (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for generating a power model for a device, the method comprising:
   identifying a device-level set of power contributors for a given state of the device that is incompletely specified, wherein each power contributor in the device-level set of power contributors contributes to power dissipation when the device is in the given state; and
   generating the power model for the device based on the device-level set of power contributors,
   wherein identifying the device-level set of power contributors for a given state of the device further comprises:
   determining states of a set of constituent cells of the device;
   determining, for each of the constituent cells, a cell-level set of power contributors that contribute to power dissipation when the constituent cells are in the states,
   wherein the device-level set of power contributors aggregates the cell-level set of power contributors for all of the constituent cells, the states of the constituent cells comprise, for each of the constituent cells, a plurality of states associated with a plurality of probabilities, and the states of at least some of the constituent cells are determined using a random simulation technique.

2. The method of claim 1, wherein the cell-level set of power contributors for each of the constituent cells is weighted by the plurality of probabilities.

3. The method of claim 1, wherein the generating comprises:
   generating a power contributor model for each standard cell in a transistor-level netlist of the device, to produce a plurality of power contributor models; and
   generating a power abstract for a block of the device based on the plurality of power contributor models.

4. The method of claim 3, wherein the generating the power contributor model comprises:
   creating, for each standard cell, one or more alternating current power elements;
   creating, for each standard cell, one or more leakage power elements; and
   creating, for each standard cell, a set of power contributor pin records.

5. The method of claim 4, wherein the creating one or more alternating current power elements comprises:
   tracing, for each standard cell, all nets and devices to a positive supply voltage contact and to a ground contact;
   allocating, for each standard cell, all non-primary input internal net caps to a boundary pin; and
   creating the one or more alternating current power elements based on the allocating.

6. The method of claim 5, wherein the allocating comprises:
   assigning a non-primary input internal net cap to a clock input of the device, when the non-primary input internal net cap is traceable to the clock input; and
   apportioning the non-primary input internal net cap over outputs of the device, when the non-primary input internal net cap is not traceable to the clock input.

7. The method of claim 5, wherein each of the one or more alternating current power elements stores a power dissipated by the standard cell while charging and discharging a capacitance during a switching event.

8. The method of claim 7, wherein each of the one or more alternating current power elements stores an effective capacitance for the standard cell.

9. The method of claim 4, wherein the one or more leakage power elements is created based on data relating to a leakage duty cycle of the standard cell.

10. The method of claim 9, wherein the data relating to the leakage duty cycle is obtained using a random simulation.

11. The method of claim 4, wherein each of the one or more leakage power elements stores a static leakage of a transistor in the standard cell.

12. The method of claim 9, wherein the static leakage is a channel leakage, a gate off leakage, or a gate on leakage.

13. The method of claim 3, wherein the generating a power abstract comprises:
   running a plurality of random simulations,
   wherein each of the random simulations simulates a different set of conditions for clock gating, input switch rate, and latch output switch rate of the standard cell, and
   wherein each of the random simulations computes an effective capacitance for the standard cell under one of the different sets of conditions.

14. The method of claim 13, wherein the running comprises:
   setting, for each of the different sets of conditions, a primary input net switching frequency to a product of a clock frequency and an input switch rate;
   setting, for each of the different sets of conditions, a scan latch output switch to zero;
   setting, for each of the different sets of conditions, a non-scan latch output net frequency to a product of the clock frequency and a latch output switch rate; and
   setting a gate to free running or to gated, based on the set of conditions.

15. The method of claim 13, wherein all effective capacitances that are computed for the different sets of conditions are combined to generate a power model for a block of the device.

16. A system for generating a power model for a device, the system comprising:
   a processor; and
   a computer readable storage medium that stores instructions which, when executed, cause the processor to perform operations comprising:
   identifying a device-level set of power contributors for a given state of the device that is incompletely specified, wherein each power contributor in the device-level set of power contributors contributes to power dissipation when the device is in the given state; and
   generating the power model for the device based on the device-level set of power contributors,
   wherein identifying the device-level set of power contributors for a given state of the device further comprises:
   determining states of a set of constituent cells of the device;
   determining, for each of the constituent cells, a cell-level set of power contributors that contribute to power dissipation when the constituent cells are in the states,
   wherein the device-level set of power contributors aggregates the cell-level set of power contributors for all of the constituent cells, the states of the constituent cells comprise, for each of the constituent cells, a plurality of states associated with a plurality of probabilities, and the states of at least some of the constituent cells are determined using a random simulation technique.

* * * * *